United States Patent [19]

Lee

[11] Patent Number: 4,649,759
[45] Date of Patent: Mar. 17, 1987

[54] FORCE TRANSDUCER

[75] Inventor: Shih-Ying Lee, Lincoln, Mass.

[73] Assignee: Setra Systems, Inc., Acton, Mass.

[21] Appl. No.: 694,927

[22] Filed: Jan. 25, 1985

Related U.S. Application Data

[63] Continuation-in-part of Ser. No. 494,450, May 13, 1983, Pat. No. 4,558,600, which is a continuation-in-part of Ser. No. 359,619, Mar. 18, 1982, Pat. No. 4,463,614, which is a continuation-in-part of Ser. No. 265,087, May 19, 1981, Pat. No. 4,448,085.

[51] Int. Cl.⁴ .............................................. G01L 1/14
[52] U.S. Cl. .............................. 73/862.64; 177/210 C; 361/283
[58] Field of Search ................ 73/862.63, 862.64, 718, 73/724; 177/210 C; 361/283

[56] References Cited

U.S. PATENT DOCUMENTS

| | | | |
|---|---|---|---|
| 3,858,097 | 12/1974 | Polye | 73/708 X |
| 4,168,518 | 9/1979 | Lee | 73/862.64 X |
| 4,237,989 | 12/1980 | Lewis | 73/862.64 X |
| 4,308,929 | 1/1982 | Estavoyer | 73/862.64 X |
| 4,434,451 | 2/1984 | Delatorre | 73/718 X |
| 4,572,006 | 2/1981 | Wolfendale | 73/862.64 |

FOREIGN PATENT DOCUMENTS

| | | |
|---|---|---|
| 0852233 | 10/1960 | United Kingdom . |
| 1089396 | 11/1967 | United Kingdom . |
| 1201308 | 8/1970 | United Kingdom . |
| 1270837 | 4/1972 | United Kingdom . |
| 1351708 | 5/1974 | United Kingdom . |
| 1530796 | 11/1978 | United Kingdom . |
| 1563894 | 4/1980 | United Kingdom . |
| 2123157 | 1/1984 | United Kingdom . |

Primary Examiner—Charles A. Ruehl
Attorney, Agent, or Firm—Kenway & Jenney

[57] ABSTRACT

Two pairs of parallel plate electrodes forming respectively a sensor capacitor and a reference capacitor are mounted on a parallelogram structure designed to deform under load in such a way that the gap width of the sensor capacitor changes as a function of load while the gap width of the reference capacitor is unaffected by the load. The capacitance of the reference capacitor is, however, similarly affected by temperature, humidity and other physical properties which may affect the dielectric constant of the medium, and is available for use in a ratio circuit to compensate for spurious changes in the sensor capacitance.

37 Claims, 9 Drawing Figures

FORCE TRANSDUCER

CROSS-REFERENCE TO RELATED APPLICATION

This application is a continuation-in-part of U.S. patent application Ser. No. 494,450 filed May 13, 1983 now U.S. Pat. No. 4,558,600, issued Dec. 17, 1985, which is a continuation-in-part of U.S. patent application Ser. No. 359,619 filed Mar. 18, 1982, now U.S. Pat. No. 4,463,614, which is a continuation-in-part of U.S. patent application Ser. No. 265,087 filed May 19, 1981, now U.S. Pat. No. 4,448,085. The subject matter of this application is related to that of U.S. patent application Ser. No. 265,088 for "Weighing System", filed May 19, 1981, now U.S. Pat. No. 4,382,479, and U.S. patent application Ser. No. 695,026 for "Capacitance Measuring System", filed June 1, 1976, now U.S. Pat. No. 4,054,833. Each of the foregoing applications and patents is incorporated by reference herein.

BACKGROUND OF THE INVENTION

The present invention is in the field of transducers, and more particularly relates to high resolution, high accuracy force transducers.

One prior art form of force or weight sensing utilizes a feedback approach using a movable coil in a fixed magnetic field. The coil is movable along a sensing axis and is driven by a current sufficient to maintain a fixed position along the sensing axis. In this configuration, the coil drive current provides a measure of forces applied to displace that coil. While this approach is generally effective, the force sensing configuration is relatively complex and correspondingly expensive.

Another form in the prior art is a strain gage load cell. In this form, however, the accuracy of the load cell is limited by hysteresis and creep of the strain gage sensor material, as well as that of the bonding material for the sensor.

Yet another force sensing approach utilizes a variable capacitance type load cell, wherein a pair of opposed, substantially parallel, conductive plates are coupled so that the force-to-be-measured causes a separation of those opposed conductor plates in a manner which is proportional to an applied force. While in principle this approach is satisfactory, there are no straight forward assemblies known in the prior art which adequately maintain the sensing plates parallel over a range of forces. Moreover, the capacitance can be affected by fringe effects, the ambient environment including electromagnetic interference, temperature, humidity and variations in materials due to aging and creep.

Accordingly, it is an object of this invention to provide an improved force sensor.

It is another object to provide an improved variable capacitance force sensor free of the effects of spurious variations in capacitance.

SUMMARY OF THE INVENTION

Briefly, in accordance with the present invention, a force transducer includes a pair of opposed rigid-body force summing members lying along a central axis. Each of these summing members includes a sensor member extending along the central axis toward the other summing member. These sensor members include opposing sensing portions which are mutually offset in the direction of a first reference axis termed the "input axis" perpendicular to the central axis. A pair of relatively flexible beam members extend between and couple the force summing members, with one beam member being on one side of the sensor members and the other beam member being on the other side of the sensor member is the preferred embodiment. The beam members are flexible about axes parallel to a second reference axis termed the "flex axis" (perpendicular to the first reference and central axes), and are substantially rigid otherwise. In the preferred form of the invention, the beam members are substantially equal in length, and the distance between their points of coupling to the sensor members are substantially equal, so that the beam members are generally parallel.

Attached to one of the force summing members is a rigid input force member which transmits a central applied force to one end of the sensor. The force input member allows the force to be applied to the middle of the beam members, rather than at their ends, to minimize direct tension and compression in the beams. In one form, this force input member is a generally L-shaped component (when viewed along the second reference axis), although the precise configuration of this component is not critical. Attached to the other force summing member is a rigid support member which transmits a reaction force to the opposite end of this other force summing member. In a preferred form, one force summing member and the adjacent input force member are part of the same monolithic structure as are the other force summing member and its associated support member. This construction allows the transducer to be formed from two monolithic component pieces that are fused or otherwise joined at the beam members. The location of the input force member and the support member are preferably such that they do not extend over the area of this junction and impede this phase of the manufacturing process.

In one form of the invention, each of the opposing sensor portions supports an electrically conductive member, in a manner providing a pair of opposed, substantially parallel, planar conductive surfaces. The conductive surfaces are offset in the direction of the first reference axis, and also are parallel to the second reference axis. In this form of the invention, the force transducer may be a monolithic dielectric structure with the conductive members being thin conductive films deposited on the opposed portions of the sensor members.

In this configuration, the force transducer may be supported at one summing member by a force parallel to the first reference axis which is applied to the rigid support member. A force-to-be-measured is applied through the rigid input force member to the other summing member parallel to that first reference axis. As that force is applied to the summing members, the beam members deform, due to their flexibility about axes parallel to the second reference axis. As the beam members deform, the sensing members and the conducting members supported by those sensing members are displaced with respect to each other in the direction of the first reference axis, while maintaining their parallel relationship. The capacitance of the effective parallel plate capacitor formed by these conductive members may be measured conventionally. The measured capacitance value is inversely proportional to the separation of the plates, and thus the force-to-be-measured.

In yet another form the entire force transducer, including both force summing members, is formed from a single piece of material. This embodiment may be molded from ceramic materials with the same configuration and component portions described above. In this "one-piece" embodiment, the conductive surfaces are preferably a coating of a conductive material on a pair of small ceramic inserts that are bonded to "one-piece" transducer so that the relatively small air gap needed for an accurate capacitor measurement can be achieved.

According to the invention, a reference capacitor is added to track and cancel out spurious variations in capacitance. In a second pair of capacitive plates having a relatively fixed gap, one of the plates is mounted on the same sensor arm which carries one of the capacitive plates for the sensor. The other plate for the reference capacitor is rigidly connected to the force summing member to which the sensor arm is connected. The other reference capacitor plate may be carried by an auxiliary arm. Deformation of the parallelogram structure causes relative displacement of the sensor arms which alters the spacing between the corresponding capacitor plates, while the spacing between the reference capacitor plates remains fixed so that the relatively fixed capacitance is available as a reference. Ideally the two capacitors are juxtaposed, essentially coplanar and nearly identical.

In another form of the invention, each capacitor plate assembly comprises a dielectric slab or plate with a metal layer on each side. One layer forms the capacitor plate and the other is connected as an electrical shield which serves chiefly to minimize fringe effects.

The force transducers of the present invention may be characterized by relatively low hysteresis, and very low creep under load, for example, where the force transducer is a monolithic structure made out of fused quartz or molded ceramic. In that form, there is relatively low thermally induced change in capacitance for given forces applied to the summing members. The force transducer is responsive primarily to the net force from the single sensing (first reference) axis, and has a relatively high rejection ratio for forces and moments in other planes.

The force transducer of the present invention may be used as a force sensor in the form of a load cell for direct measurement of force. Alternatively, the transducer may be used to sense other forces such as inertial forces (when used in conjunction with a mass), or pressures when used in conjunction with a diaphragm.

BRIEF DESCRIPTION OF THE DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENT

Figure 1:
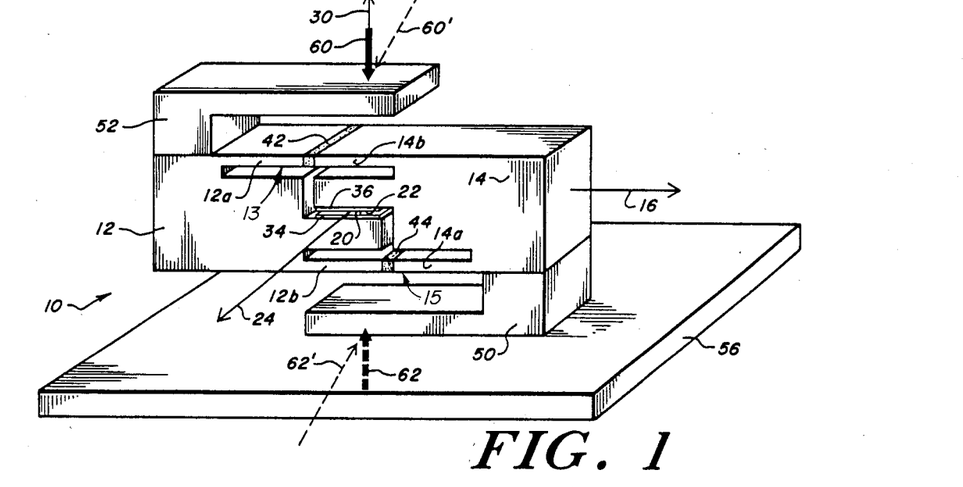
FIG. 1 shows an exemplary force transducer in accordance with the present invention.

FIG. 1 shows a transducer 10 in accordance with the present invention. The transducer 10 includes a pair of rectangular cross-section, elongated, rigid force summing members 12 and 14, extending along a common central axis 16. Elongated member 12 is shown also in FIG. 2. Members 12 and 14 include complementary faces at their adjacent ends. As shown, the entire end portions of members 12 and 14 form the complementary faces, although in other embodiments, the complementary faces may be only a portion of the adjacent ends.

In the illustrated embodiment, the faces of members 12 and 14 include planar portions 20 and 22, respectively, which are offset in the direction of a first reference axis 30, which axis is perpendicular to central axis 16. The planar portions 20 and 22 are parallel to a second reference axis 24, which is perpendicular to axes 16 and 30. First and second axes 30 and 24 are conveniently referred to as the input axis and flex axis, respectively. In the preferred embodiment, the planar portions 20 and 22 are also parallel to central axis 16, although in other embodiments, the planar portions may be angularly offset from axis 16. As shown, the faces on either side of faces 20 and 22 are parallel to input axis 30 and perpendicular to central axis 16, although other orientations of these faces might also be used. In the present embodiment, members 12 and 14 are substantially identical. These members are joined to form the transducer 10.

The elongated members 12 and 14 each include two planar slots extending from their complementary faces in planes parallel to the axes 16 and 24.

Figure 2:
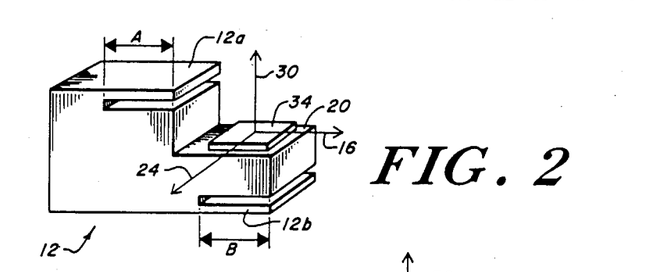
FIG. 2 shows one of the force summing members and beam portions of the embodiment of FIG. 1.

In the embodiment illustrated in FIGS. 1 and 2, both slots in each of members 12 and 14 are of identical depth. However, in other embodiments, in each of members 12 and 14, one slot may have a depth A and the other slot may have a depth B, where at least one of A and B is non-zero and where the sum of A+B equals a predetermined value. Moreover, the two slots in member 12 are spaced apart in the direction of input axis 30 so that the upper beam portion 12a and the lower beam portion 12b of member 12 (i.e. the beam portions bounded by the slots and outer surfaces of member 12) are relatively flexible in response to moments about axes parallel to the flex axis 24.

In the present embodiment, members 12 and 14 are substantially identical. As a result, the two slots of member 14 are considered to define "upper" beam portion 14a and "lower" beam portion 14b.

The planar portions 20 and 22 of members 12 and 14 each support one of substantially planar electrically conductive members 34 and 36.

The upper beam portion 12a and lower beam portion 14b of members 12 and 14, respectively, are joined by member 42 to form upper coupling beam 13 and the lower beam portion 12b and upper beam portion 14a of members 12 and 14, respectively, are joined by member 44 to form lower coupling beam 15. In the resultant configuration, the complementary faces of members 12 and 14 are mutually offset in the direction of axis 16 and the opposed conductive surfaces of members 34 and 36 are mutually offset in the direction of input axis 30. In the preferred form, the members 12 and 14 are quartz, and the adjoining members, 42 and 44, are also quartz so that the members may all be fused together to form a monolithic structure. In alternate embodiments, other materials, such as titanium silicate, ceramics or other dielectric materials may be used.

As shown in FIG. 1, the transducer 10 also includes a rigid support member 50 rigidly attached to member 14 and a rigid input force member 52 rigidly attached to member 12. These members 50 and 52 may also be quartz and fused to the respective ones of blocks 12 and 14. The support member 50 is coupled to the upper planar surface of a transducer support element 56.

Figure 3:
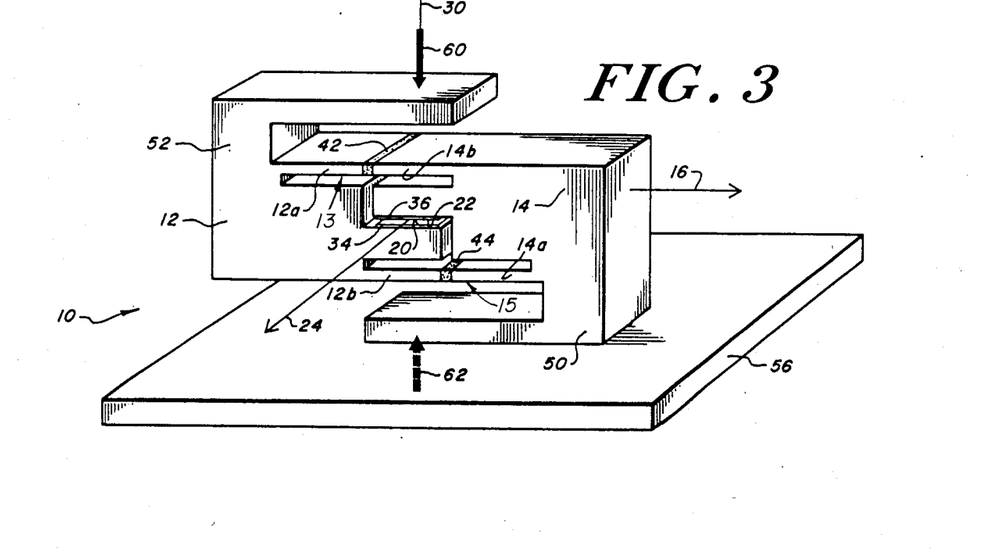
FIGS. 3-6 show alternative embodiments of the force transducer of FIG. 1.

FIG. 3 shows an alternative embodiment similar to the FIG. 1 embodiment except that support member 50 is formed integrally with the member 14 from a single homogeneous piece of a dielectric material and the rigid input force member 52 is formed integrally as part of member 12, also from a single homogeneous piece of a dielectric material. Suitable such materials are quartz and ceramics. This construction avoids problems associated with bonding dissimilar materials and the possibility of operational problems once the bond has been made. Such operational problems can include a rupture or change in the condition of this bond due to differences in the response of the materials to variable parameters such as temperature, or simply due to use and aging over a period of time.

Figure 4:
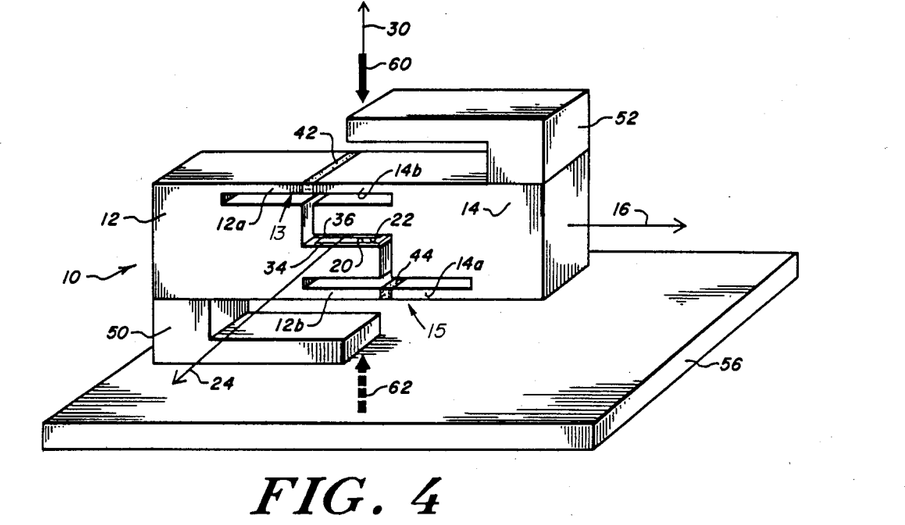

FIG. 4 shows another alternative embodiment similar to the FIG. 1 embodiment except that the rigid support member 50 is rigidly attached to the member 12 and the rigid input force member 52 rigidly attached to the member 14. In other words, the members 50 and 52 are mounted on opposite ends of the members 12 and 14 than in the FIG. 1 embodiment. In contrast to the FIG. 3 embodiment, the members 50, 52, 12 and 14 are not formed from two homogeneous pieces of material. Also, with the member 52 mounted at the upper right hand end of the member 14 (as shown), the member 52 does not extend far enough to interfere with the fusing or joining of the beam members 12a and 14b at 42.

Figure 5:
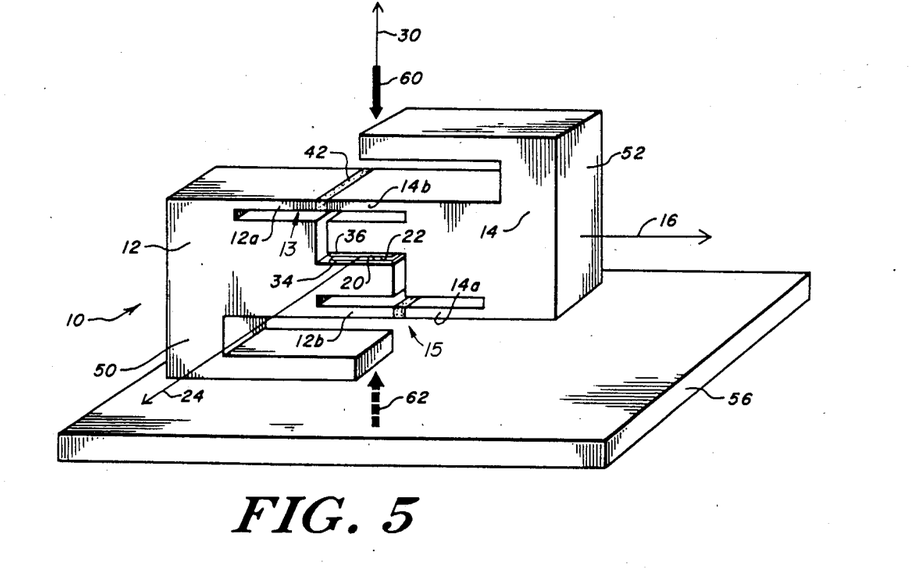

The embodiment of FIG. 5 is similar to the FIG. 4 embodiment except that the rigid support member 50 and member 12 are formed integrally out of the same homogeneous piece of dielectric material as are rigid input force member 52 and member 14. As in the FIG. 3 embodiment, this construction allows the transducer 10 to be formed from only two component fabrications (each having three open-ended slots) that are fused together or otherwise joined at 42 and 44. This avoids the problems noted above with respect to the FIG. 3 embodiment. The dielectric material may be quartz or a ceramic.

Figure 6:
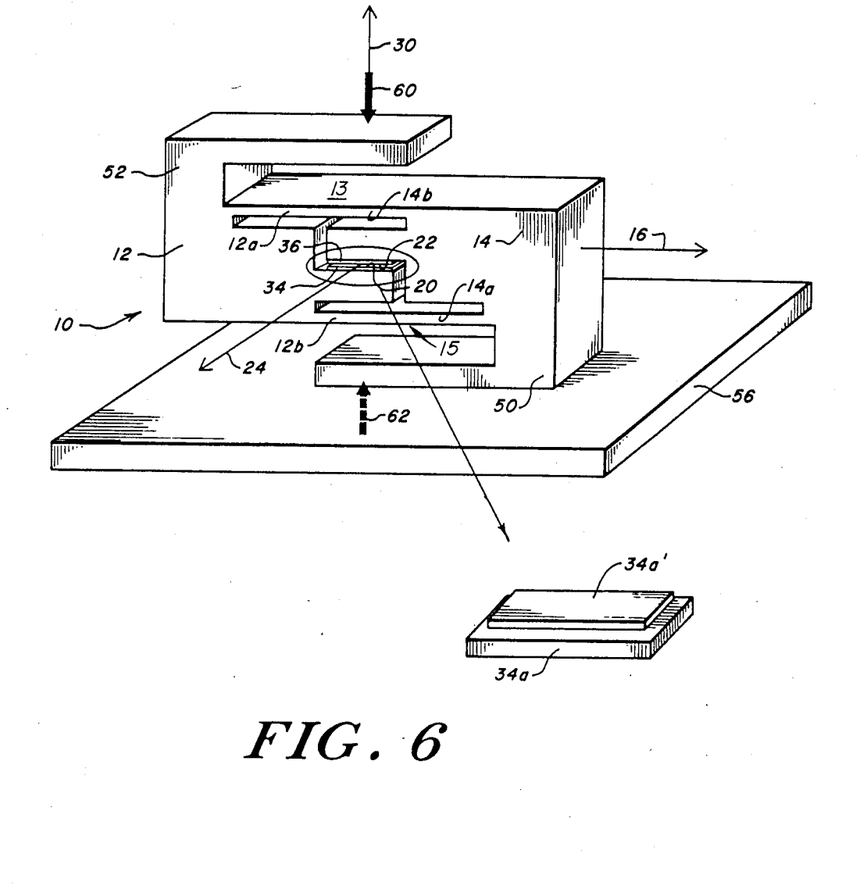

FIG. 6 shows yet another embodiment where the rigid force summing members 12 and 14 and coupling beams 13 and 15 as well as the force input member 52 and the support member 50 are all formed integrally from a single piece of homogeneous dielectric material. While the appropriate openings might be fabricated from a single block of quartz, this embodiment is particularly useful where the transducer 10 is formed from a molded ceramic. Since the electrically conductive members 34, 36 must be very closely spaced (typically 0.003 to 0.006 inch), directly molding a gap that is sufficiently narrow and properly forming or positioning the conductive surfaces within the gap can be difficult. To avoid this problem, the capacitive gap is preferably fabricated to be wider than the actual spacing of the opposed conductive surfaces. A pair of inserts 34a, 36a (FIG. 6) are bonded in place within the gap. The inserts are preferably formed from the same dielectric material as the other components of the transducer. Each insert carries a layer of a conductive material 34a', 36a' on one face and these conductive layers, of course, face one another. The thickness of the inserts 34a, 36a is selected to produce the correct close spacing between the conductive layers while facilitating the fabrication of this "one-piece" transducer.

The operation of the transducer 10 of the present invention can be best understood with reference to FIG. 1. A force-to-be-measured, indicated by arrow 60, is applied along the input axis 30 to the input member 52. That force is transmitted to the left hand (as illustrated) portion of member 12. In response to the applied force applied to the member 52, an equal and opposite force (indicated by arrow 62) is applied to the support member 50 at the upper surface of element 56. The latter force is transmitted to the right hand (as illustrated) portion of member 14. The members 50 and 52 apply the effective force-to-be measured to the center of the transducer rather than its ends. Due to the symmetry of this construction, the direct (non-bending) tension and the direct compression introduced into the two beam members 13 and 15 is minimized.

In response to the force pair applied to the transducer 10, the upper and lower coupling beams 13 and 15 of transducer 10 deform in a manner so that the conductive members 34 and 36 separate by a distance related to the magnitude of the force pair applied to the transducer 10, while maintaining their parallel relationship. More specifically, the coupling beams 13 and 15 deflect in an S-shaped curve with stresses concentrated at the ends of each beam near the associated force summing member. Near the center of each beam is a point of inflection which experiences substantially no bending stress. The magnitude of the capacitance of the effective capacitor formed by members 34 and 36 may be measured conventionally, and provides a measure of the force applied to member 52.

In the embodiments shown in FIGS. 4 and 5 the force-to-be-measured is transmitted via the force input member 52 to the right-hand (as illustrated) portion of member 14. In response to the force applied to member 52, an equal and opposite force (indicated by arrows 62) is applied to the support member 50 at the upper surface of element 56. The latter force is transmitted to the left hand (as illustrated) portion of member 12. In response to the force pair applied to the transducer 10, the upper and lower coupling beams 13 and 15 of transducer 10 deform in a manner so that the gap between the conductive members 34 and 36 is reduced by a distance related to the magnitude of the force pair applied to the transducer 10, while maintaining their parallel relationship. The measured capacitance value is inversely proportional to the gap between the members 34 and 36.

Because the transducer 10 is highly resistant to moments and forces in directions other than along input axis 30, the applied force pair (represented by arrows 60 and 62) need not be along axis 30. For example, with forces in the directions of broken arrows 60' and 62' of FIG. 1, the separation between conductive members 34 and 36 is inversely proportional to the applied force components in direction of input axis 30.

As the upper and lower coupling beams 13 and 15 deform, as noted above, there is stress in those members. In the illustrated embodiment, due to the symmetry of the system where the slot depths A and B are equal and blocks 12 and 14 are substantially similar, the junctions formed by the beam joining members 42 and 44 occur at bending stress inflection points, i.e. where bending moments are zero. In other forms of the invention, for example, where the slot depths A and B differ and particularly where one of the slot depths A or B may equal zero, the junction of the elements does not occur at these stress inflection points. Under this condition, the junction formed by joining members 42 and 44 is lightly stressed and a relatively low quality, and thus inexpensive, junction may be used.

Where the invention is constructed from quartz, for example, the force transducer 10 is characterized by very low hysteresis and very low creep under load, with precision index on the order of $10^{-5}$ to $10^{-6}$. Moreover, the device is characterized by a relatively low thermally-induced changing capacitance.

The force transducer 10 generally responds only to net force along the single input axis 30 and maintains a relatively high rejection ratio for forces in other planes. The elements 12 and 14 of the present embodiment may be readily constructed of a rectangular elongated quartz block which is cut to form the complementary surfaces. The two blocks having those complementary surfaces merely have a pair of slots cut to form the upper and lower beam portions. The beam portion-forming slots may be on opposite sides of the sensing portion, as shown, or may be on the same side. In the FIG. 3 and FIG. 5 embodiments, the two blocks each have three open ended slots.

The blocks are joined to form a transducer by joining the beam portions, for example, by fusion, to form a rugged, monolithic structure. In other forms of the invention, other materials, including metals, may be used for members 12 and 14, provided at least one of members 34 and 36 is insulated from the other. The elements 50 and 52 may be metal or other material.

In the embodiments discussed previously, the faces 20,22 are preferably planar, parallel to one another and closely spaced, but non-planar configurations are also possible. Also, each face preferably supports an electrically conductive member 34 or 36. The conductive portions can be metallic coatings, foils, or the like mounted directly on the faces 20,22 or on inserts as described above with reference to FIG. 6. Also, while the sensor members are shown as being straight and generally aligned with the input axis 30, they can have a more complex shape or be mutually inclined with respect to this reference axis. Stated in more general terms, the sensor members can each extend generally in a direction that forms an angle of 0° to 90° with respect to the central axis. Preferably, as shown, the sensor portions (faces) 20, 22 and the conductive members 34, 36 carried on these faces overlap one another for a substantial portion of the length of the sensor members to provide an enhanced absolute value of the capacitance changes being measured. This is important so that the capacitance variations being produced and measured are greater than capacitances in the lead wires or measuring circuitry which could otherwise introduce troublesome noise or errors in the final measured value.

While the sensor members can be formed of a different material than the flexible members, they preferably are formed of the same material, for example, quartz bonded to quartz, ceramic bonded to ceramic, or as a single, integral construction of one homogeneous piece of material that is fabricated (including molding) to form the flexible member and the associated sensor member. In a "one-piece" embodiment such as that shown in FIG. 6, all of the elements of the transducer 10 can be formed of a molded ceramic.

Figure 7:
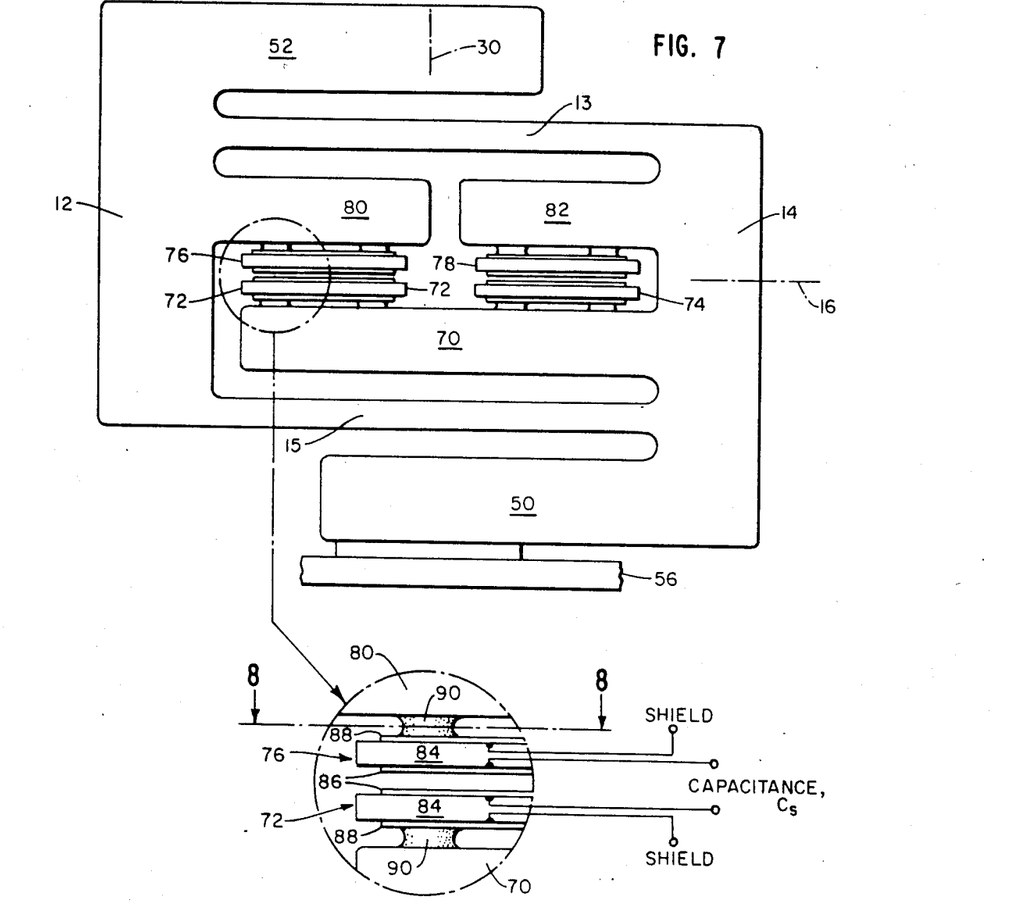
FIG. 7 is a side view of an improved embodiment of the parallelogram force transducer equipped with a reference capacitor and electrical shielding with a magnified detail side view of a portion of the sensing units.
Figure 8:
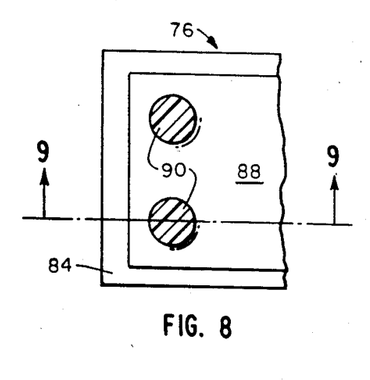
FIG. 8 is a sectional view of the back of the sensing element taken along lines 8—8 of FIG. 7.
Figure 9:
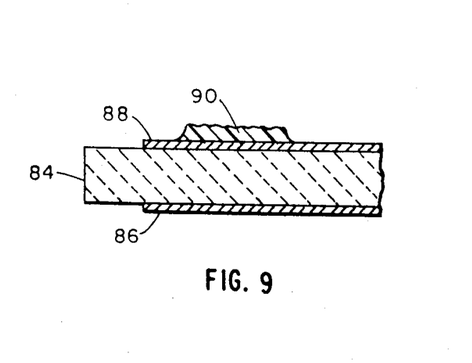
FIG. 9 is a sectional view of a portion of one of the sensing elements taken along lines 9—9 of FIG. 8.

FIG. 7 depicts an improved embodiment of the parallelogram force transducer which yields higher accuracy. The preferred embodiment is a molded ceramic structure similar in overall design to the embodiment of FIG. 6. Elements similar in function to the corresponding elements of FIG. 6 are identified in FIG. 7 with the same reference numerals, for example, the relatively rigid force summing side members 12 and 14 and flexible beams 13 and 15. The general operation of the transducer of FIG. 7 is the same as that of FIG. 6. However, in FIG. 7, instead of having just one set of capacitor plates forming the sensing unit, the transducer has two. The second capacitor is used as a "dummy" capacitor or reference capacitor and remains relatively fixed despite deformation of the parallelogram. The objective is to construct the second capacitance very similarly to the active sensor and mount it so that it will be exposed to the same environment as the sensor itself.

This is accomplished in the preferred embodiment by molding an elongated sensor member 70 which projects parallel to the beams 13 and 15 from the right-hand force summing member 14 toward the opposed force summing member 12. The arm formed by sensor member 70 supports two identical capacitor assemblies 72 and 74 lying generally in the same plane perpendicular to the plane of the central and input axes 16 and 30. Corresponding capacitor elements 76 and 78 are supported by a pair of shorter aligned arms 80 and 82 projecting inwardly toward each other from the force summing members 12 and 14 respectively, as shown in FIG. 7. Arms 80 and 82 are preferably identical in geometry and mass. As arms 70 and 82 extend from the same force summing member 14, they do not experience relative displacement. That is, arms 70 and 82 and side member 14 are not only preferably integral but are also rigid and do not therefore undergo deformation relative to each other. Capacitor plate assemblies 74 and 78 are thus disposed in gapped opposed alignment with each other to form a reference capacitor with a relatively fixed air gap between the capacitor plates.

The other set of capacitive plate elements 72 and 76 form the active portion of the sensor and act in essentially the same manner as the sensing elements in the embodiments of FIGS. 1-6. In particular, the element 76 is supported below the arm 80 which is cantilevered from the summing member 12 so that the capacitor element 76 is in opposed alignment with capacitive element 72 on the elongated arm 70. The gap between capacitive elements 72 and 76 is nominally substantially identical to the fixed gap between elements 74 and 78 forming the reference capacitor. On application of force 60, beams 13 and 15 deflect causing a narrowing of the gap between the capacitive elements 72 and 76. Optionally, arm 70 can be located above arms 80 and 82, in which case the gap would widen upon deflection in the direction of arrow 60.

Each capacitive plate assembly 72, 74, 76 and 78 is preferably substantially identical in construction, geometry and mass and is mounted in a similar way on its respective arm. Preferably capacitive assemblies 76 and 78 are substantially coplanar as are capacitive assemblies 72 and 74.

As shown in the magnified detailed view of FIG. 7, each capacitive assembly comprises a dielectric slab or plate 84 carrying parallel metal layers 86 and 88 on the opposite faces of the plate 84. Layers 86 and 88 may be formed in the same way from conductive foil or a metal coating deposited by conventional means. The dielectric plate 84 may be made from the same material as the integral parallelogram structure, e.g., molded ceramic, or fused quartz. The capacitive assembly is elevated from the respective mounting arm 70 on pedestals of cementing material 90. The bonding material may be a low coefficient of expansion glass (at or near the coefficient of quartz or ceramic) that also has a lower melting point than the base material. Conventional epoxy materials will also work, but may suffer from worse long term disability. The capacitive plate assemblies may be cemented in place with removable shims like thickness gauges to attain the desired gap between corresponding capacitive plate assemblies.

As shown in FIG. 7, metal layers 86 of corresponding capacitive assemblies 72 and 76 face each other across the air gap and are electrically connected as shown to form the active sensor capacitor whose capacitance CS varies with applied force. The other metal layers 88 on the back of the corresponding assemblies 72 and 76 are connected together and grounded to form an electric shield like a Faraday cage, to mininize fringe effects and to isolate the sensor capacitor from the effect of stray flux lines and other electromagnetic interference. The construction and electrical connection of the reference capacitor comprising assemblies 74 and 78 is identical to that of the active sensor capacitor.

In operation, the capacitance formed by the active and reference capacitors are applied electronically to ratio circuitry, such as that disclosed in U.S. Pat. No. 4,054,833 to Briefer, assigned to the assignee of the present application, in order to cancel out common mode spurious capacitance changes due to temperature variation, dielectric change of air (e.g., caused by humidity changes) and other effects of the ambient environment as well as mechanical changes due to aging of the materials and creep. The identical construction of the two capacitors makes them subject to the same problems. Thus, the dummy capacitor formed by capacitive assemblies 74 and 78 is not intended to be a fixed capacitance, but is intended to track spurious changes in the capacitance of the sensor capacitor. A simple ratio of the sensor capacitance $C_S$ and the reference capacitance serves to normalize the sensor reading and remove drift and offset components which would otherwise degrade the accuracy of the force reading.

The advantages of the embodiment of FIG. 7 lie chiefly in its increased accuracy and reliability. The dummy capacitor removes the need for electronic compensation particularly for the effect of temperature and humidity on the dielectric constant of the air gap. Moreover, the electrical shielding helps to reduce fringe effects and isolate both capacitance capacitors from stray flux lines. The elevated mounting arrangement serves to thermally isolate each capacitive plate assembly from the respective mounting arms 70, 80 and 82. This is important because of the different thermal expansion coefficients of the metal layer and the molded ceramic body of the parallelogram structure.

While the preferred embodiment employs an integral molded ceramic parallelogram structure similar to that shown in FIG. 6, the dual capacitor system is equally applicable to other embodiments of the parallelogram transducer such as that shown in FIG. 1, for example, for the tapered beam embodiment shown in U.S. Pat. No. 4,463,614 assigned to the assignee of the present application, the dual capacitor arrangement may be used without the electrical shielding system and vice versa. For example, the capacitor plate assemblies of FIG. 7 may be substituted for the sensing units 34 and 36 in FIG. 6. Similarly, the capacitive plate assembly 34a and 34a' shown in FIG. 6, may replace the capacitor plate assemblies in the dual capacitor embodiment of FIG. 7.

The location of the two companion arms 70 and 82 which extend from the same summing member can be altered in several different ways. For example, the arms can be reversed. That is, arms 70 and 82 can be connected to summing member 12 rather than 14. In either case, there will be no relative displacement between the two arms 70 and 82. Although it is preferred to have both capacitors essentially coplanar, the auxiliary arm 82 could be located on the other side of the elongated arm 70 with the capacitive plate assemblies 74 and 78 being similarly located below the arm 70 as viewed in FIG. 7. This arrangement, however, would be less compact. In addition, auxiliary arm 82 may be carried directly by the elongated arm 70 rather than being connected to the side member 14 if desired. With this in mind, it would be possible to connect the sensing arms 70 and 80 to the flexible beams 13 and 15, respectively as shown in the immediate parent application Ser. No. 494,450 in the embodiment of its FIG. 7.

However, it is preferred to connect the sensing arms to the inflection point. Thus, in that case, it would be desirable not to have a separate auxiliary arm 82 connected to the flexible beam but rather to have it connected directly to the elongated arm 70. The shielding system is also applicable to the embodiments of FIGS. 7 and 8 in the copending application Ser. No. 494,450.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A force transducer, comprising
   a pair of opposed, rigid force summing members, formed of a dielectric material, each of said summing members including a sensor member projecting therefrom parallel to a central axis toward the other summing member, said sensor members including opposing sensing portions spaced from each other in the direction of an input axis which is perpendicular to said central axis,
   first and second parallel coupling beam members formed of a dielectric material lying generally in the plane of said input and central axes and extending parallel to said central axis between said force summing members and connected thereto, said first and second beam members being relatively flexible along their respective lengths about axes parallel to a flex axis which is perpendicular to said central and input axes, said first and second beam members being substantially rigid otherwise,
   said first and second beam members and said force summing members together forming a parallelogram structure, coplanar with said central and input axes, that flexes elastically at said beam members in response to force applied generally along said input axis, whereby the resulting relative displacement of said sensing portions is related to the forces applied to said summing member, a first pair of opposed, parallel electrical conductors affixed to said sensing portions, respectively, said first pair of conductors being offset in the direction of said input axis under the application of force, whereby the capacitance associated with said first pair of conductors is related to the forces applied to said force summing members, an auxiliary member projecting from one of said summing members parallel to said central axis toward the other summing member spaced along said input axis from the adjacent sensor member of said one summing member, and a second pair of opposed, parallel electrical conductors affixed, respectively, to said auxiliary member and said adjacent sensor member, whereby the spacing between said second pair of conductors is relatively fixed so that said second pair of conductors may serve as a reference capacitor.

2. The transducer of claim 1, further comprising means for electrically shielding the capacitor formed by each of said corresponding conductors.

3. The transducer of claim 2, wherein said shielding means includes a pair of electrically conductive layers parallel to each pair of said conductors and arranged on opposite sides thereof.

4. The transducer of claim 3, further comprising a plurality of capacitive plate assemblies each including a two sided dielectric slab having metal layers affixed to the two respective sides of said slab and means for mounting each said assembly such that one of said layers forms a corresponding one of said conductors and the other of said layers forms an electrical shield.

5. The transducer of claim 4, wherein said mounting means includes means for rigidly mounting each said assembly in spaced relationship with the corresponding member.

6. The transducer of claim 5, wherein said mounting means includes at least three pedestals of bonding material between each said assembly and the respective member.

7. The transducer of claim 4, further including means for electrically interconnecting the shielding layers in each corresponding pair of said assemblies.

8. The transducer of claim 1, wherein said force summing members, coupling beam members, sensor members and auxiliary member are formed by a single monolithic body of dielectric material.

9. The transducer of claim 8, wherein said monolithic body is a molded ceramic.

10. The transducer of claim 1, wherein said first and second pairs of conductors are substantially identical.

11. The transducer of claim 1, wherein said auxiliary member is substantially identical in geometry and mass to the sensor member projecting from said other summing member.

12. The transducer of claim 1, wherein said adjacent sensor member projecting from said one summing member is longer than the sensor member projecting from said other summing member, said sensor members being arranged in an overlapping relationship.

13. The transducer of claim 12, wherein the sensing portion of said adjacent sensor member being located near the end of said adjacent longer sensor member.

14. The transducer of claim 13, wherein one of the conductors in said other pair of conductors forming said reference capacitor islocated near the juncture of said longer sensor member with said one summing member.

15. The transducer of claim 14, wherein the capacitors formed by said first and second pairs of conductors are substantially coplanar.

16. The transducer of claim 15, wherein said sensor member projecting from said other summing member and said auxiliary member projecting from said one summing member are identical in geometry and mass and symmetrically disposed.

17. The transducer of claim 16, wherein said sensor member of said other summing member and said auxiliary member are aligned with each other in gapped opposing relationship.

18. The transducer of claim 1, wherein said first and second pairs of conductors are located between said beam members.

19. A force transducer, comprising
a dielectric parallelogram structure having two opposite sides formed of relatively flexible beams connected to two other opposite sides formed of relatively rigid members, means for applying force to said structure along an input axis perpendicular to said beams whereby the parallelogram structure is deformed, first and second sensor arms projecting respectively from two of said opposite sides, the ends of said arms being in spaced overlapping relationship with each other, a first pair of corresponding capacitor plate elements mounted in spaced opposition on said first and second sensor arms, respectively, and a second pair of corresponding capacitor plate elements mounted in fixed spaced opposition and rigidly connected to said structure at a location where the spacing between said second pair of elements is unaffected by deformation of said structure by the applied force, at least one of said second pair of elements being located on a surface of said structure on which neither of said first pair of elements are located, whereby deformation of said parallelogram structure by force applied along said input axis causes relative displacement of said first and second arms which altes the spacing between the corresponding first pair of elements to provide a force-dependent variable capacitance while the spacing between the other corresponding pair of elements remains relatively fixed so that said second pair of elements provides a reference capacitance.

20. The transducer of claim 19, wherein one of said second pair of elements is mounted on one of said sensor arms.

21. The transducer of claim 19, wherein said second pair of elements is rigidly connected to the same one of said rigid members.

22. The transducer of claim 19, wherein said arms are connected to said rigid members and said second pair of elements is connected respectively to one of said rigid members and the arm projecting therefrom.

23. The transducer of claim 19, wherein said arms are connected to said flexible beams, respectively.

24. The transducer of claim 19, wherein said parallelogram structure and sensor arms are formed by a single monolithic body of dielectric material.

25. The transducer of claim 24, wherein said monolithic body is a molded ceramic.

26. The transducer of claim 19, wherein said capacitor plate elements are all substantially identical.

27. The transducer of claim 26, wherein said capacitor plate elements in one pair are coplanar with the corresponding capacitor plate elements in the other pair.

28. The transducer of claim 27, wherein said capacitor plate elements are all substantially parallel and perpendicular to the plane of said parallelogram structure.

29. The transducer of claim 19, further comprising means for electrically shielding the capacitor formed by each of said pair of capacitor plate elements.

30. The transducer of claim 29, wherein said shielding means includes a pair of electrically conductive layers parallel to said capacitor plate elements and arranged on opposite sides thereof.

31. The transducer of claim 30, further comprising a plurality of capacitive plate assemblies each including a two sided dielectric slab having metal layers affixed to the two respective sides of said slab and means for mounting each said assembly such that one of said layers forms a corresponding one of said capacitor plate elements and the other of said layers forms an electrical shield.

32. The transducer of claim 31, wherein said mounting means includes means for rigidly mounting each said assembly in spaced relationship with the corresponding member.

33. The transducer of claim 32, wherein said mounting means includes at least three pedestals of bonding material between each said assembly and the respective member.

34. The transducer of claim 31, further including means for electrically interconnecting the shielding layers in each corresponding pair of said assemblies.

35. A capacitive force transducer, comprising
a dielectric parallelogram structure including two opposite sides formed by relatively flexible beams connected to two other opposite sides formed by relatively inflexible side members,
means for applying force to said structure along an input axis perpendicular to said beams whereby said parallelogram structure is deformed,
first and second sensor arms rigidly connected respectively to corresponding side members and projecting therefrom so that their free ends overlap in spaced relationship,
spaced opposed parallel sensing elements affixed to corresponding locations on said first and second arms respectively for relative displacement upon deformation of said parallelogram,
each said sensing element including a dielectric slab having two faces, each of which carries a parallel, electrically conductive layer,
means for mounting the sensing elements on the respective arms such that the conductive layers are all parallel to each other, the two inner layers facing each other defining a variable capacitor, and
means for electrically interconnecting the other outer layers of said sensing elements to form an electrical shield.

36. The transducer of claim 35, further comprising means for mounting each said sensing element in spaced relationship with the respective arm.

37. The transducer of claim 36, wherein said mounting means includes for each sensing element at least three pedestals of cementing material between the sensing element and the respective arm.

* * * * *